(12) United States Patent
Abe

(10) Patent No.: US 8,122,803 B2
(45) Date of Patent: Feb. 28, 2012

(54) VISE ASSEMBLY

(75) Inventor: Kenji Abe, Anjo (JP)

(73) Assignee: Makita Corporation, Anjo (JP)

( * ) Notice: Subject to any disclaimer, the term of this patent is extended or adjusted under 35 U.S.C. 154(b) by 608 days.

(21) Appl. No.: 12/292,194

(22) Filed: Nov. 13, 2008

(65) Prior Publication Data

US 2009/0133558 A1    May 28, 2009

(30) Foreign Application Priority Data

Nov. 22, 2007  (JP) .................................. 2007-303449

(51) Int. Cl.
*B23D 47/04* (2006.01)

(52) U.S. Cl. ............. 83/453; 83/465; 83/466; 83/471.3; 83/581; 269/9; 269/45

(58) Field of Classification Search ............ 83/452, 83/453, 465, 466, 467.1, 468.1, 468.2, 468.3, 83/468.7, 471, 471.3, 472, 473, 477.2, 490, 83/581; 269/9, 10, 43, 44, 55, 73, 74, 76, 269/77, 81, 84, 88, 92, 95, 97, 100, 101, 269/110, 112, 114, 140, 142, 152, 316, 45
See application file for complete search history.

(56) References Cited

U.S. PATENT DOCUMENTS

| 914,299 | A | * | 3/1909 | McCarthy | 83/466 |
|---|---|---|---|---|---|
| 1,169,671 | A | * | 1/1916 | Nihlen | 269/41 |
| 1,175,811 | A | * | 3/1916 | Ray | 269/91 |
| 2,221,397 | A | * | 11/1940 | Fluhr | 269/91 |
| 4,265,154 | A | * | 5/1981 | Batson | 83/468 |
| 4,283,977 | A | * | 8/1981 | Batson | 83/453 |
| 4,587,875 | A | * | 5/1986 | Deley | 83/471.3 |
| 4,637,288 | A | * | 1/1987 | Olsen et al. | 83/375 |
| 5,181,702 | A | * | 1/1993 | Pettigrew | 269/93 |
| 5,730,434 | A | * | 3/1998 | Schoene et al. | 269/88 |
| 6,254,077 | B1 | * | 7/2001 | Riley, Jr. | 269/287 |
| 6,481,320 | B1 | | 11/2002 | McGrory et al. | |
| 6,543,323 | B2 | * | 4/2003 | Hayashizaki et al. | 83/466 |
| 7,159,496 | B2 | * | 1/2007 | Maes | 83/452 |
| 7,464,737 | B2 | * | 12/2008 | Duginske | 144/253.1 |
| 7,721,632 | B2 | * | 5/2010 | Chen | 83/452 |
| 2008/0018038 | A1 | * | 1/2008 | Utsuno et al. | 269/90 |

FOREIGN PATENT DOCUMENTS

| JP | A-2000-263502 | 9/2000 |
|---|---|---|
| JP | B2-3925043 | 3/2007 |

* cited by examiner

*Primary Examiner* — Edward Landrum

(74) *Attorney, Agent, or Firm* — Oliff & Berridge, PLC

(57) ABSTRACT

In a bench circular sawing machine as one example of a cutting machine, a vise assembly to be mounted to a guide fence includes a pressing part (e.g., an arm and a feed screw) configured to be capable of moving upward and downward and fixed at a desired height, in a position protrusively frontward of the guide fence, and a second pressing part (e.g., stopper plate) configured to be capable of moving along the guide surface upward and downward and fixed at a desired height. One of the pressing part and the second pressing part is selected for use in holding a workpiece down from above.

10 Claims, 4 Drawing Sheets

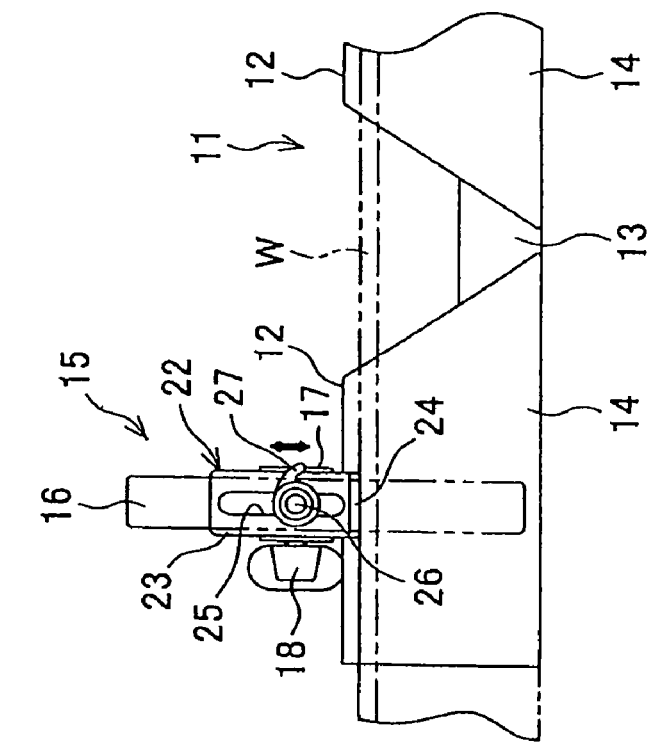
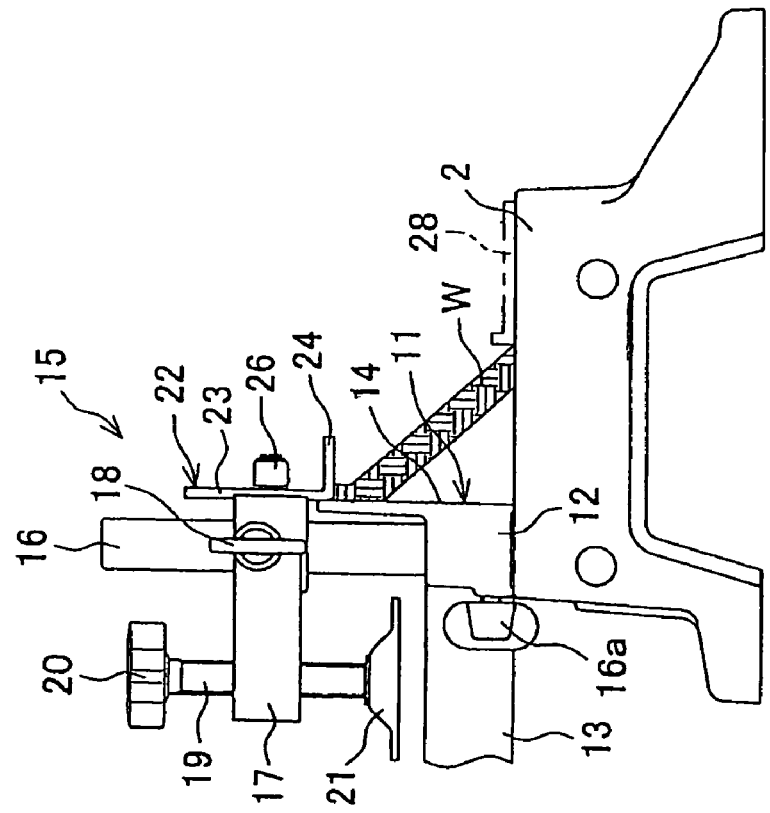
FIG. 2B
FIG. 2A

VISE ASSEMBLY

BACKGROUND OF THE INVENTION

This application claims the entire benefit of Japanese Patent Application Number 2007-303449 filed on Nov. 22, 2007, the entirety of which is incorporated by reference.

1. Field of the Invention

This invention relates to a vise assembly provided in a cutting machine such as a bench circular sawing machine in order to hold a workpiece in the cutting machine, and also to a cutting machine in which the vise assembly is used.

2. Description of Related Art

In a bench circular sawing machine as one example of a cutting machine, its main body including a rotary blade is attached to an arm provided upright on a rear portion of a base in such a manner that the main body is swingable upward and downward. By the downward swinging operation of the main body, the rotary blade is moved accordingly so as to cut a workpiece placed on the base. On the base is provided a guide fence extending laterally and having a guide surface vertical to a top face of the base so that a workpiece may be pressed against the guide surface, to facilitate positioning of the workpiece. The guide fence is provided with a vise assembly which includes a pressing part or jaw disposed protrusively frontward of the guide fence. The pressing part can be moved upward and downward and fixed at a desired height. With this pressing part, the vise assembly is configured to press from above and firmly hold a workpiece that has been abutted against the guide surface.

In a case where the workpiece to be cut is for crown moldings (decorative parts which are to be fitted to corners between a ceiling and an adjoining wall), however, the workpiece is rested in an unstably leaned position against the guide surface during the cutting process. Therefore, even if the workpiece is pressed against the guide surface by hand, the crown molding workpiece would become so shaky and unsettled that the workpiece disadvantageously could not be positioned adequately. In this case, the vise assembly is designed specifically for a workpiece having a rectangular cross section such as a board, a plank or a square bar, and is configured to vertically press and hold a top face of the workpiece down by means of a circular metal part or the like. Thus, if the vise assembly of this type could be used to hold a crown molding workpiece in a leaned position, proper positioning of the workpiece would not be achieved in a stable manner.

With this in view, Japanese Unexamined Patent Publication No. 2000-263502 and Japanese Patent Publication 3925043 disclose a tilted or swingable fence that is angle-adjustably mounted to a guide fence. The tilted fence is disposed protrusively frontward from the guide surface of the guide fence in such a manner that the tilted fence can be fixed at any tilt angle so that a crown molding workpiece can be supported from its underside by a tilted surface of the fence in an appropriate position. Further, U.S. Pat. No. 6,481,320 B1 discloses an L-shaped holder capable of holding a crown molding workpiece in a leaned position with its upper and lower edges retained by rims of the holder. Thus, the holder with a crown molding workpiece held therein is pressed against the guide fence so as to make the workpiece positioned adequately.

However, the approaches proposed in the above-cited documents are not to introduce improvements in the existing vise assembly itself but to require either a substantial modification in the design of the guide fence so as to add the tilted or swingable fence or an extra part such as the holder to be provided in addition to the guide fence, and thus necessitate additional manufacturing costs and managerial tasks. Moreover, the tilted or swingable fence should be manipulated and pulled out from the guide surface before a crown molding workpiece is placed thereon, or crown molding workpieces should be attached to and detached from the holder one by one for each cutting process; in this way, handling of the additional tilted fence or holder may be considered to be burdensome and inconvenient.

It would thus be desirable to provide a vise assembly, and a cutting machine in which the vise assembly is used, by which a crown molding workpiece can be easily positioned and held stably in an adequate position without any significant modification on the existing part or provision of an additional part necessitated, with reduced costs and ease of operation.

The present invention has been made in an attempt to eliminate the above disadvantages, and illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is an aspect of the present invention to provide a vise assembly for use with a guide fence provided on a base of a cutting machine for positioning a workpiece over the base, the vise assembly comprising:

a pressing part configured to be capable of moving upward and downward and fixed at a desired height in a position protrusively frontward of the guide fence;

a second pressing part configured to be capable of moving along the guide surface upward and downward and fixed at a desired height;

wherein one of the pressing part and the second pressing part is selected for use in holding the workpiece down from above.

More specifically, in this configuration, preferably but not necessarily, the second pressing part may be a separate element mounted to the pressing part in such a manner that the second pressing part is capable of moving upward and downward relative to the pressing part; alternatively, the second pressing part may be integrally formed in a desired portion of the pressing part.

According to the above aspect of the present invention, the vise assembly comprises the second pressing part, and thus a crown molding workpiece can be easily positioned and held stably in an adequate position by making use of this second pressing part without significant modification made to the guide fence or provision of an additional part necessitated. Consequently, the ease of operation can be improved and the increase of costs can be suppressed.

In a particular embodiment where the second pressing part is a separate element mounted to the pressing part, the positioning of a crown molding workpiece can be performed through a simple operation of moving only the second pressing part upward and downward. In this way, the ease of operation can be improved.

In another embodiment where the second pressing part is integrally formed in a desired portion of the pressing part, the second pressing part can be easily fabricated.

BRIEF DESCRIPTION OF THE DRAWINGS

The above aspect, other advantages and further features of the present invention will become more apparent by describing in detail illustrative, non-limiting embodiments thereof with reference to the accompanying drawings, in which:

FIGS. 2A and 2B explicatively illustrate the vise assembly, of which a side elevation is shown in FIG. 2A, and a front elevation is shown in FIG. 2B;

DETAILED DESCRIPTION OF THE EXEMPLARY EMBODIMENTS

Exemplary embodiments of the present invention will be described hereinafter with reference to the accompanying drawings.

[First Embodiment]

Figure 1:
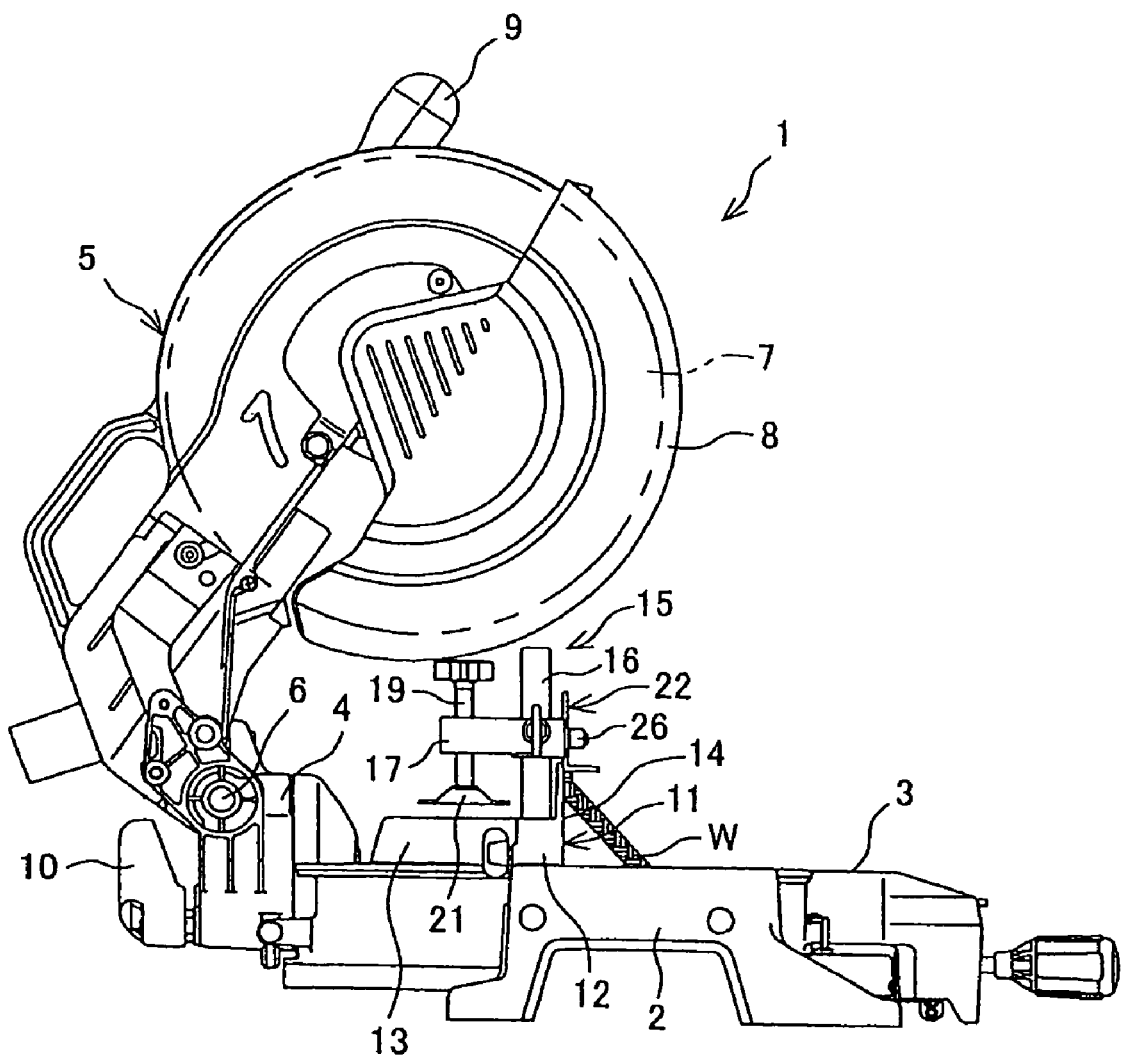
FIG. 1 is a side view of a bench circular sawing machine with a vise assembly, according to a first exemplary embodiment of the present invention.

Referring to FIG. 1, a bench circular sawing machine 1 as one example of a cutting machine according to the first embodiment of the present invention comprises a base 2, a round turntable 3, placed over the base 2 in such a manner that the turntable 3 can be horizontally rotated substantially at a center of the base 2, a joint part 4 rotatably provided at a middle position of a rear side (left side in FIG. 1) of the turntable 3, and a main body 5 of which a lower end is connected to an upper end of the joint part 4 by a pivot 6 in such a manner that the main body 5 can be swung upward and downward about the pivot 6. The main body 5 includes a disk-like saw blade 7 as one example of a rotary blade which is configured to be rotated by a motor (not shown) provided at a side of the main body 5, and the saw blade 7 is disposed in a front/rear direction. The main body 5 is always biased upward by a torsion spring (not shown) provided on the pivot 6 and thus normally retained in an upper limit position as shown in FIG. 1. Denoted by reference numeral 8 is a safety cover which is configured to cover the saw blade 7 when the main body 5 is in the upper limit position and to turn in such a direction as to reveal the saw blade 7 according as the main body 5 is moved downward. Denoted by reference numeral 9 is a handle. The joint part 4 is configured to be movable to the right or to the left and fixed at any angle relative to the turntable 3 by means of a lever 10.

Provided over the base 2 and fixed at its right and left portions is a guide fence 11 which is disposed laterally to cross over the turntable 3, perpendicularly to the saw blade 7 as viewed from top, such that the guide fence 11 is kept out of contact with the turntable 3. The guide fence 11 includes, as also shown in FIGS. 2A and 2B, a pair of left and right guide parts 12 shaped like a typeface of a letter L with its vertical segment fallen flat and its horizontal segment raised upright, a semicircular roundabout part 13 which diverts around a blade edge plate provided in a center of the turntable 3 and by which the left and right guide parts 12 are connected. At a front face of each guide part 12 is provided a guide surface 14 which is perpendicular to a top face of the turntable 3.

A vise assembly 15 in this embodiment is mounted to the right guide part 12. The vise assembly 15 comprises: a guide rod 16 disposed upright and mounted at a rear portion of the guide part 12 by a thumb screw 16a; a rod-like arm 17 disposed perpendicularly to the guide rod 16, mounted on a periphery of the guide rod 16, and configured to be capable of moving along the guide rod 16 and fixed by a thumb screw 18 at a desired height; and a feed screw 19 screwed vertically in a first-end portion of the arm 17 which is closer to a first end of the arm 17. The feed screw 19 has a knob 20 provided at an upper end thereof and a disk-like metal part 21 provided at a lower end thereof. The arm 17 is allowed to be fixed when the arm 17 is laid such that the first end faces frontward or rearward, i.e., when the first-end portion in which the feed screw 19 is provided is either on the front side or the rear side with respect to the guide rod 16. The arm 17 and the feed screw 19 in combination serve as a pressing part for use in holding a workpiece down from above.

A second-end portion of the arm 17 which is closer to a second end (opposite to the first end) of the arm 17 is opposite to the first-end portion in which the feed screw 19 is provided. A stopper plate 22 for a crown molding workpiece, as one example of a second pressing part, is provided at an end face of the second end which faces frontward when the arm 17 is positioned such that the feed screw 19 is located directly rearward of the guide rod 16. The stopper plate 22 is an L-shaped part which consists of a vertically oriented sliding portion 23 and a horizontally oriented pressing portion 24 projecting frontward from a lower end of the sliding portion 23. The stopper plate 22 has a slit 25 extending in an upward-and-downward direction in a center of the sliding portion 23, and is configured to be capable of moving upward and downward along the guide surface 14 of the guide part 12 using a clamp screw 26 inserted through the slit 25 and screwed in the guide rod 16. A stroke of the stopper plate's movement is defined by upper and lower ends of the slit 25 which come in contact with the clamp screw 26 at lower-limit and upper-limit positions of the stopper plate 22, respectively. An operation lug 27 to be manipulated to turn the clamp screw 26 is protrusively provided at a periphery of a head of the clamp screw 26. When the stopper plate 22 is set in a desired position and the operation lug 27 is pushed down and the clamp screw 26 is screwed into the arm 17, the sliding portion 23 is held between the head of the clamp screw 26 and the arm 17 and the stopper plate 22 can be fixed in that position.

With the bench circular sawing machine 1 configured as described above, when a crown molding workpiece W is to be cut, the crown molding workpiece W is rested against the guide surface 14 of the guide part 12 as shown in FIGS. 1 and 2A, and the arm 17 of the vise assembly 15 is turned horizontally to a position shown in FIG. 2A where the feed screw 19 is located rearward of the guide part 12. Then, arm 17 is fixed above the guide part 12 at a height such that a lower edge of the arm 17 is slightly higher than an upper edge of the guide part 12. Accordingly, the stopper plate 22 comes to a position frontward of the guide surface 14 at a height such that the pressing portion 24 of the stopper plate 22 is located at an upper edge of the guide surface 14. Then, the cramp screw 26 is loosened, and the stopper plate 22 is lowered until the pressing portion 24 comes in contact with an upper edge of the crown molding workpiece W. With the pressing portion 24 being kept in contact with the upper edge of the crown molding workpiece W, the cramp screw 26 is screwed in and fastened tight to the arm 17 again so that the stopper plate 22 is fixed in position. In this way, the upper edge of the crown molding workpiece W is held down by the stopper plate 22 from above, and is properly positioned. In an exemplary embodiment where a positioning metal part 28 which is configured to be movable horizontally relative to the guide fence 11 and to be fixed at any position is provided on the base 2, the positioning metal part 28 is brought into contact with the lower edge of the crown molding workpiece W from the front side, and fixed in position.

With the crown molding workpiece W positioned in this way, when a switch (not shown) provided in the handle 9 is turned on, the motor is driven to rotate the saw blade 7. Then, the main body 5 is moved downward by means of the handle 9, and the crown molding workpiece W can be cut at right angles with the guide fence 11. Since the crown molding workpiece W is held down at its upper edge by the stopper plate 22, it is unlikely that the crown molding workpiece W will rattle or bounce during its cutting operation, with the result that the cutting operation can be carried out precisely with the crown molding workpiece W held in a desired cutting position without fail. The turntable 3 may be turned to cut a workpiece with the saw blade 7 swiveled horizontally to set at an angle shifted with respect to a front/rear direction. On the other hand, the main body 5 may be tilted by means of the lever 10 to cut a workpiece with the saw blade 7 tilted sideways to set at an angle shifted with respect to a vertical direction. After completion of the cutting operation, the cramp screw 26 may be loosened to release the crown molding workpiece W by removing the holding force applied by the stopper plate 22 to the crown molding workpiece W.

On the other hand, when a workpiece having a rectangular cross section such as a square bar is to be cut subsequently, the thumb screw 18 is loosened and the arm 17 is turned horizontally to a position where the first end of the arm 17 (on the first-end portion of the arm 17 in which the feed screw 19 is provided) faces frontward, so that the vise assembly 15 can be used as a conventional vertical vise with the feed screw 19. To be more specific, the thumb screw 18 is loosened, the arm 17 and the feed screw 19 are lowered until the metal part 21 comes in contact with the upper surface of the workpiece set on the turntable 3, and the knob 20 is manipulated to screw the feed screw 19 downward. Then, fine adjustments are made in the position of the metal part 21 to further press the metal part 21 against the upper surface of the workpiece, so that the workpiece can be fixed firmly for subsequent cutting operation.

As described above, with the vise assembly 15 and the bench circular sawing machine 1 according to the aforementioned embodiment, the stopper plate 22 is provided which is configured to be capable of moving upward and downward along the guide surface 14 of the guide fence 11 and fixed at any height as desired, and one of the arm 17 in combination with the feed screw 19 and the stopper plate 22 is selected for use in holding the workpiece down from above. Therefore, a crown molding workpiece W can be easily positioned and held stably in an adequate position by making use of this stopper plate 22 without significant modification made to the guide fence 11 or provision of an additional part necessitated. Consequently, the ease of operation can be improved and the increase of costs can be suppressed.

Particularly, in this embodiment, the stopper plate 22 is provided as a separate element mounted to the arm 17 in such a manner that the stopper plate 22 is capable of moving upward and downward independently relative to the arm 17, and thus the positioning of a crown molding workpiece W can be performed through a simple operation of moving only the stopper plate 22 upward and downward, which improves the ease of operation.

Figure 3:
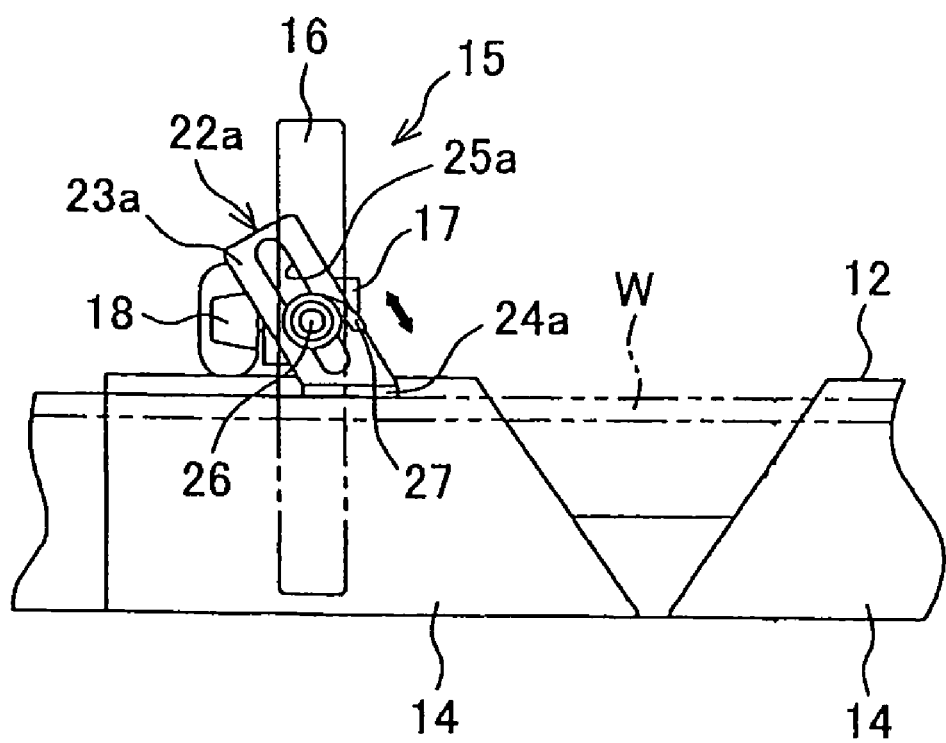
FIG. 3 is a front view of a modified form of a vise assembly.

Although the above-described embodiment exemplifies a specific configuration in which the stopper plate 22 is capable of moving vertically upward and downward, a stopper plate 22a as shown in FIG. 3 may be adopted of which a sliding portion 23a and a slit 25a are tilted to make a lower portion of the stopper plate 22a close to a center of the guide fence 11. This configuration makes the abutment position of the pressing portion 24a against the upper edge of the crown molding workpiece W closer to the saw blade, and thus serves to effectively suppress the rattle or bounce of the crown molding workpiece W that would otherwise occur during its cutting operation.

It goes without saying that the shape of the second pressing part consistent with the present invention is not limited to that like the aforementioned stopper plate 22, 22a. Various modifications and changes may be made in the shape of the second pressing part as long as such modifications or changes are effective in proper positioning of a crown molding workpiece W; for example, a simple shape like a board, plate, plank or bar without a pressing portion, or an inverted T-shape with a laterally elongated pressing portion may be appropriate. Moreover, the structure or configuration for rendering the second pressing part capable of moving upward and downward may not necessarily be considered to be limited to the illustrated embodiment in which a cramp screw and a slit are utilized, but any other structures such as a screw feed mechanism, etc. may be employed.

[Second Embodiment]

A second embodiment of the present invention will be described. The general construction of the bench circular sawing machine according to the second embodiment is substantially the same as that of the first embodiment described above, and thus a duplicate description thereof will be omitted, and the following discussion focuses mainly on a vise assembly, though the same elements as in the first embodiment will be designated by the same reference numerals and a duplicate description thereof will be omitted as well.

Figure 4A:
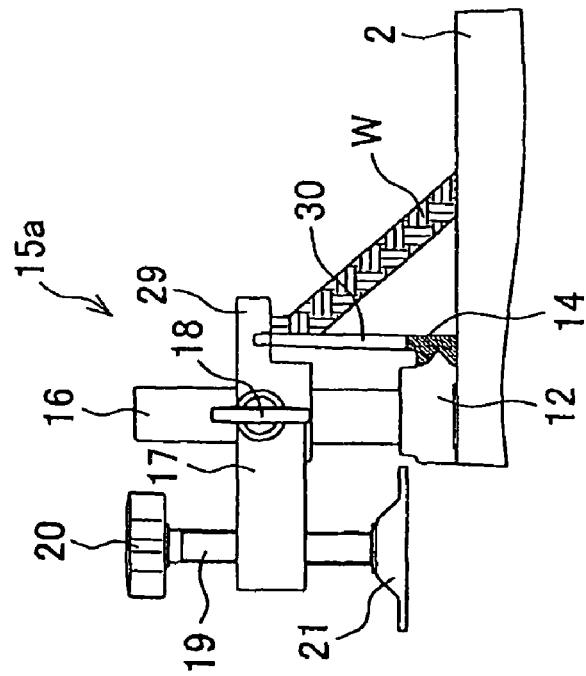
FIGS. 4A and 4B explicatively illustrate a vise assembly, of which a side elevation is shown in FIG. 4A, and a front elevation is shown in FIG. 4B, according to a second exemplary embodiment of the present invention.
Figure 4B:
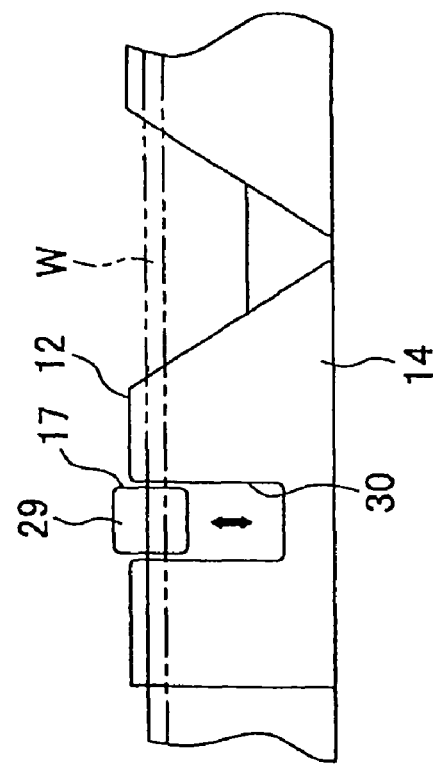

In a vise assembly 15a according to the second embodiment of the present invention as shown in FIG. 4A, a stopper portion 29 as an another example of a second pressing part is provided at the second end of the arm 17 opposite to the first end (of the first-end portion in which the feed screw 19 is provided) of the arm 17. The stopper portion 29 protrudes on an extension of the arm 17 and is formed integrally with the arm 17. The stopper portion 29 has a thickness reduced by half from that of the arm 17, and is composed of a portion of the arm 17 protruding from an upper half of the second end of the arm 17. This stopper portion 29 is arranged to protrude frontward of the guide surface 14 when the arm 17 is laid such that its second end faces frontward, and the guide portion 12 has a notch 30 formed therein through which the stopper portion 29 is allowed to protrude frontward of the guide surface 14.

In this embodiment, when a crown molding workpiece W is to be cut, the crown molding workpiece W is rested against the guide surface 14 of the guide part 12, and the arm 17 of the vise assembly 15a is turned horizontally to a position shown in FIG. 4A where the feed screw 19 is located rearward of the guide part 12, and then the stopper portion 29 provided at the opposite end of the arm 17 comes to a position above and frontward of the guide surface 14. Thereafter, the arm 17 is lowered until the stopper portion 29 enters to the notch 30 and comes in contact with an upper edge of the crown molding workpiece W, and the thumb screw 18 is screwed in to fix the arm 17 so that the upper edge of the crown molding workpiece W is held down by the stopper portion 29 from above, and is properly positioned. Therefore, it is unlikely that the crown molding workpiece W will rattle or bounce during its cutting operation, with the result that the cutting operation can be carried out precisely with the crown molding workpiece W held in a desired cutting position without fail. After completion of the cutting operation, the thumb screw 18 may be loosened and the arm 17 is moved upward to release the crown molding workpiece W by removing the holding force applied by the stopper plate 22 to the crown molding workpiece W.

As described above, with the vise assembly 15a according to the second embodiment as described above, the arm 17 mounted in the vicinity to the guide fence 11 is utilized in a reasonable manner to easily position and stably hold a crown molding workpiece W in a fixed position, without significant modification made to the guide fence 11 or provision of an additional part necessitated, like the vise assembly 15 according to the first embodiment. Consequently, the ease of operation can be improved and the increase of costs can be suppressed.

Particularly, in this embodiment, the stopper portion 29 is integrally formed at the end of the arm 17, and thus the second pressing part can be formed with ease. In this embodiment as well, it is to be understood that the second pressing part is not limited by the specific form and configuration of the stopper portion illustrated herein, and various modifications and changes may be made thereto; for example, the thickness of the stopper portion may be changed and a separate element, instead of integrally formed stopper portion, may be secured to the arm, where appropriate.

In both of the first and second embodiments, in common, the pressing part is not limited by the illustrated combination of the arm and the feed screw, but any other configurations may be applicable to the embodiments in which a second pressing part consistent with the present invention is adopted; for example, a pressing part protrusively provided directly on an underside of the arm and configured to be abutted against a workpiece, or a pressing part configured to be moved upward and downward together with a guide rod may be employed instead.

Furthermore, the vise assembly consistent with the present invention is also applicable to a slide circular saw having a mechanism for enabling a main body to slide frontward and rearward by means of a slide bar, a circular saw of a type without a turntable and/or without a bevel-cut mechanism, a cutter without cutting teeth, and other types of cutting machines.

It is contemplated that various other modifications and changes may be made to the exemplary embodiments of the invention without departing from the scope of the embodiments of the present invention as defined in the appended claims.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A vise assembly for use with a guide fence provided on a base of a cutting machine for positioning a workpiece over the base, the vise assembly comprising:
    a pressing part configured to be capable of moving upward and downward and fixed at a desired height in a position protrusively frontward of the guide fence;
    a second pressing part configured to be capable of moving along the guide fence upward and downward and fixed at a desired height,
    wherein one of the pressing part and the second pressing part is selected for use in holding the workpiece down from above; and
    a guide rod disposed upright in a position fixed relative to the guide fence, wherein
        the pressing part has an arm mounted on a periphery of the guide rod, and a feed screw,
            the arm being disposed perpendicularly to the guide rod, and being capable of moving along the guide rod and fixed at a desired height when the arm is laid such that one of first and second ends of the arm faces frontward while the other faces rearward, and
            the feed screw being screwed vertically in a first-end portion of the arm closer to the first end, a lower end of the feed screw having a metal part; and
        the second pressing part being provided at a second-end portion of the arm closer to the second end, and one of the pressing part and the second pressing part being selected by changing a direction of the arm with respect to the guide rod between a direction in which the first end faces frontward and a direction in which the second end faces frontward.

2. The vise assembly according to claim 1, wherein the second pressing part is a separate element mounted to the pressing part in such a manner that the second pressing part is capable of moving upward and downward relative to the pressing part.

3. The vise assembly according to claim 1, wherein the second pressing part is integrally formed in a desired portion of the pressing part.

4. The vise assembly according to claim 1, wherein the second pressing part comprises a stopper plate bent into an L-shape.

5. The vise assembly according to claim 4, wherein the stopper plate has a slit extending in an upward-and-downward direction, and is capable of moving upward and downward using a clamp screw inserted through the slit and screwed in the guide rod.

6. The vise assembly according to claim 4, wherein the stopper plate is tilted to make a lower portion of the stopper plate close to a center of the guide fence.

7. The vise assembly according to claim 1, wherein the second pressing part comprises a stopper portion provided in a position on an extended line from the second end of the arm, the stopper portion being arranged to protrude frontward of the guide surface through a notch provided in the guide fence.

8. The vise assembly according to claim 7, wherein the stopper portion is formed integrally with the arm, and a thickness of the stopper is reduced by half from that of the arm, and is composed of a portion of the arm protruding from an upper half of the second end of the arm.

9. A cutting machine comprising:
    a base over which a workpiece is allowed to be placed;
    a main body including a rotary blade, the main body being capable of moving upward and downward above the base;
    a guide fence provided on the base to position the workpiece; and
    a vise assembly according to claim 1 which is mounted to the guide fence.

10. The cutting machine according to claim 9, wherein the guide fence comprises a pair of right and left guide parts each bent into an L-shape, and a connecting part by which the guide parts are connected, the vise assembly being mounted to one of the guide parts.

* * * * *